Figure 1:
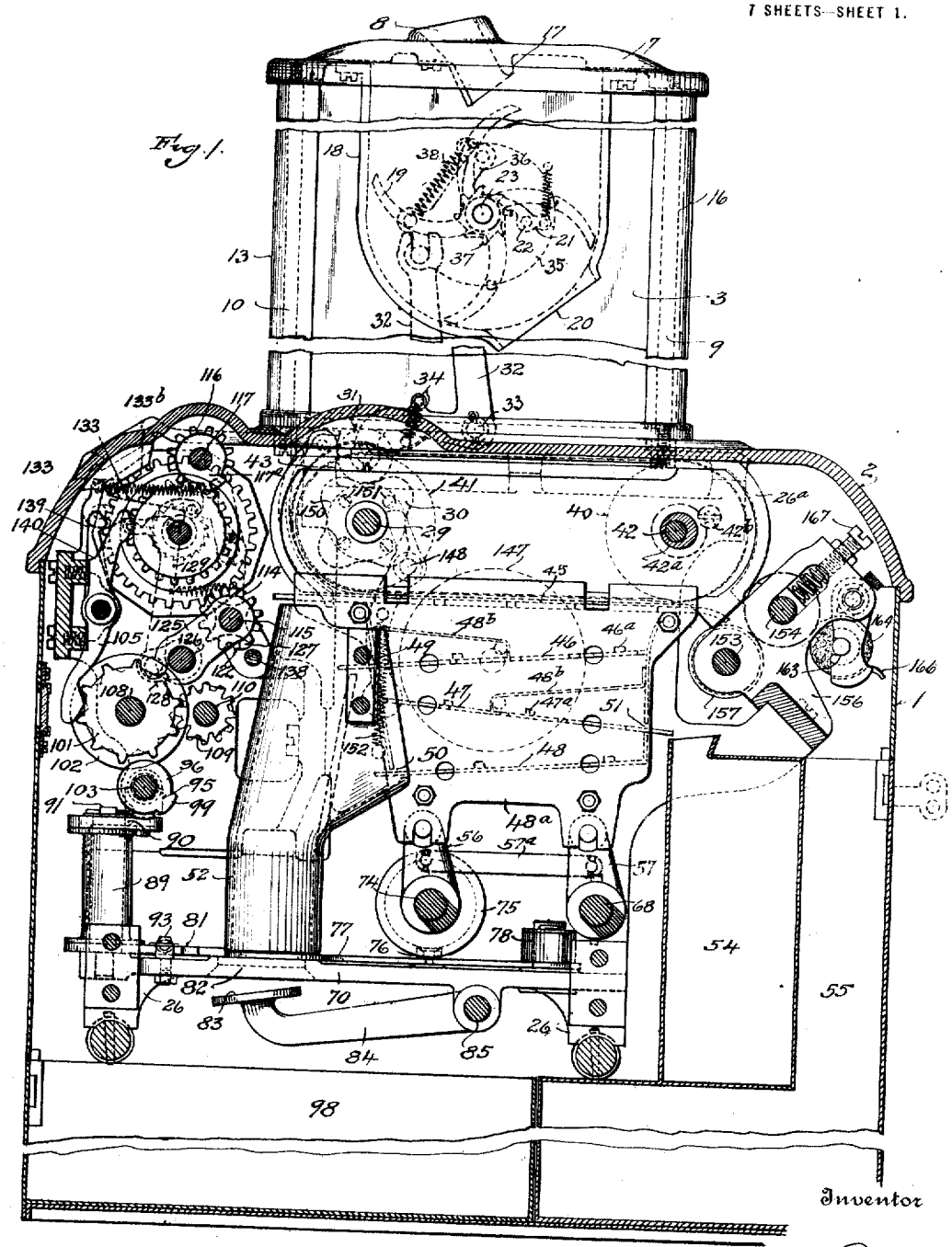

D. B. WHISTLER.
COIN TICKET REGISTERING FARE BOX.
APPLICATION FILED JULY 10, 1916.

1,267,343.

Patented May 21, 1918.
7 SHEETS—SHEET 1.

Inventor
David B. Whistler

D. B. WHISTLER.
COIN TICKET REGISTERING FARE BOX.
APPLICATION FILED JULY 10, 1916.

1,267,343.

Patented May 21, 1918.
7 SHEETS—SHEET 5.

INVENTOR
David B. Whistler

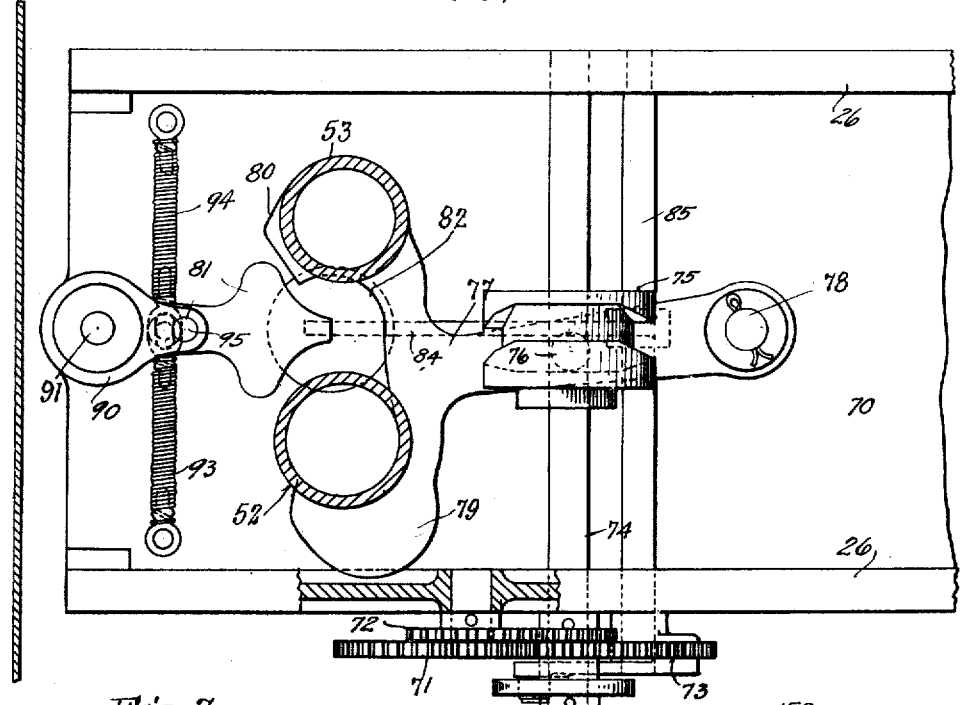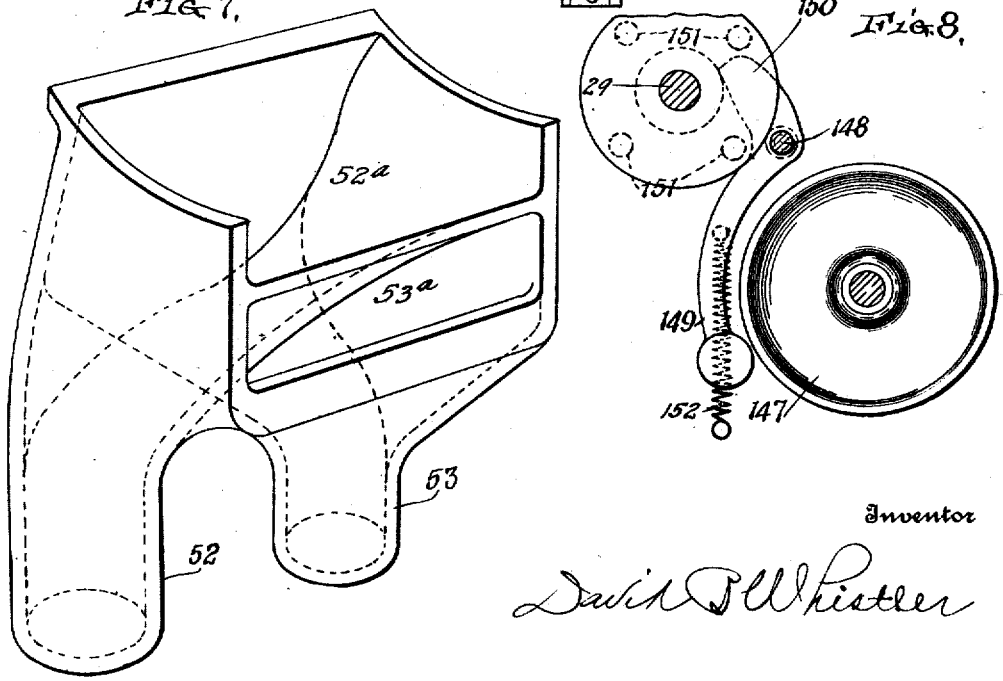

D. B. WHISTLER.
COIN TICKET REGISTERING FARE BOX.
APPLICATION FILED JULY 10, 1916.
1,267,343.
Patented May 21, 1918.
7 SHEETS—SHEET 7.
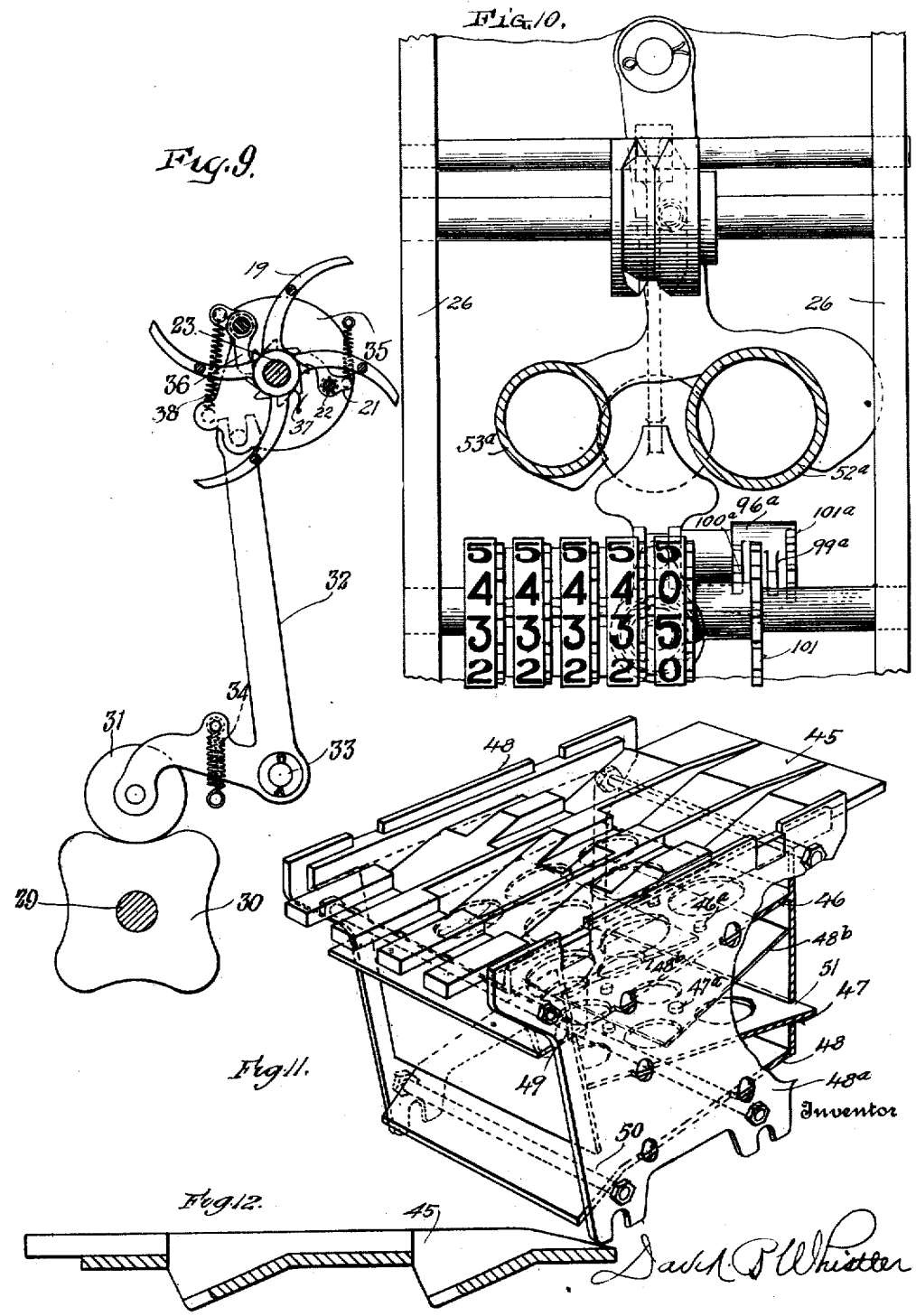

UNITED STATES PATENT OFFICE.

DAVID B. WHISTLER, OF DAYTON, OHIO, ASSIGNOR TO THE AMERICAN RAILWAYS EQUIPMENT COMPANY, OF DAYTON, OHIO, A CORPORATION OF OHIO.

COIN-TICKET-REGISTERING FARE-BOX.

1,267,343.

Specification of Letters Patent.  Patented May 21, 1918.

Application filed July 10, 1916.  Serial No. 108,355.

*To all whom it may concern:*

Be it known that I, DAVID B. WHISTLER, a citizen of the United States, residing at Dayton, in the county of Montgomery and State of Ohio, have invented certain new and useful Improvements in Coin-Ticket-Registering Fare-Boxes, of which the following is a specification, reference being had therein to the accompanying drawings.

This invention relates to improvements in coin-ticket registering fare boxes, and has for its object to provide a fare box adapted to receive and register mixed coin and ticket fares. In a broad sense, the invention is an improvement of the device which forms the subject matter of my application for Letters Patent, Ser. No. 865,853, filed October 9, 1914. However, an entirely different principle of construction is employed in the present instance; the two inventions being alike only in the broad functions of receiving and registering mixed coin and ticket fares through a unitary machine.

The fundamental idea of the invention, as in the case of the earlier application, is to provide a unitary machine upon which all fares may be registered, and through which all money-value fares may be collected and mechanically safe-guarded without intermediate handling. To this end the fare box is provided with the usual money counter to register the value of cash fares; also with a trip-passenger counter and a total-passenger counter, the trip-passenger counter indicating at all times registration of the full passenger load, and the total-passenger counter serving as a basis to check operations from one conductor to another, or from one day to another. Transfers, passes, etc., are collected over the box but are registered on the box the same as coins and tickets paid into the box, the registering mechanism being actuated once for each fare paid of whatever kind.

The combination of fare register and fare box meets every requirement, in a single machine, of the "double check" system of fare collection, without the use of the overhead fare register, as is now common practice, and, therefore, simplifies the work of conductors by having all fares registered on one machine instead of two. The conductor's attention is not divided between fares paid into the fare box and fares rung-up on the fare register, and the opportunities for "misses" of fares, errors of registration, and other irregularities, whether voluntary or involuntary, which cause much loss to railway companies, are materially reduced.

The object of the present invention is to provide improved devices which will separate coin and ticket fares, which will separate the coins according to denomination and register them according to their value: and which will register the value of all fares received; and to provide such a mechanism which will be simple in its construction, positive in its operation and will be of such a character that the parts thereof will not be easily broken or so disarranged as to prevent the proper operation thereof, and, hence, to provide such a device which will be commercially practical for service on street cars and the like. To this end it is a further object of the invention to provide a fare separating device adapted to receive mixed coin and ticket fares, and comprising a movable part to act on said fares to separate the tickets from the coins and deliver the tickets to a canceling mechanism; to so construct said movable part that it will deliver the fares to the separating device as well as effect the separation thereof; to provide coin separating devices arranged to receive the coins which have been separated from the tickets and separate them according to their denominations; and to provide other devices to position and act upon the coins which have been separated according to their value to cause them to engage and control the operation of mechanism adapted to register the value of each coin. It is also an object of the invention to so construct and arrange the movable part of the fare separating device that the coins which are being delivered to the separating device will be exposed for examination; and to provide means for delivering fares to said movable member of such a character that the fares cannot be withdrawn after they have been deposited therein. It is a further object of the invention to so construct the coin separating device that pennies will not be discharged to the registering devices, but to a separate receptacle. It is also an object of the invention to so construct and arrange the several parts of the mechanism as to provide a compact structure in which the several parts will closely coöperate one with the other in the accomplishment of the purpose of the mechanism as a whole, that is, the separation of the fares, the delivery of the coins, except the pennies, to the registering mechanism, and the delivery of the tickets to the canceling rolls; and to so construct and arrange the several parts of the mechanism that each operation of a single operating device will actuate each part thereof.

A further purpose of the invention is to provide a machine of the character described, of simple, durable construction; positive and reliable in the construction and operation of all its parts, and highly efficient in the performance of its functions. To this end mechanism has been used which is practicably unbreakable and untamperable, incapable of wrong operation, and which is adapted in all respects to the conditions and contingencies of use for which it is intended. In the construction shown in the drawings provision is made for hand operation only, but it is obvious that various forms of foot-operated mechanism, motors and motor drives of suitable design may be employed to operate the machine. While I have shown the invention in a preferred form adapted for a specific use, I wish it to be understood that it is not limited to the exact construction shown, nor to the single use specified, for various modifications of the mechanism will occur to one skilled in the art, and other uses can be made of it without departing from the principles of construction or from the spirit of the invention, and other objects of the invention will appear as the mechanism is described in detail.

Figure 2:
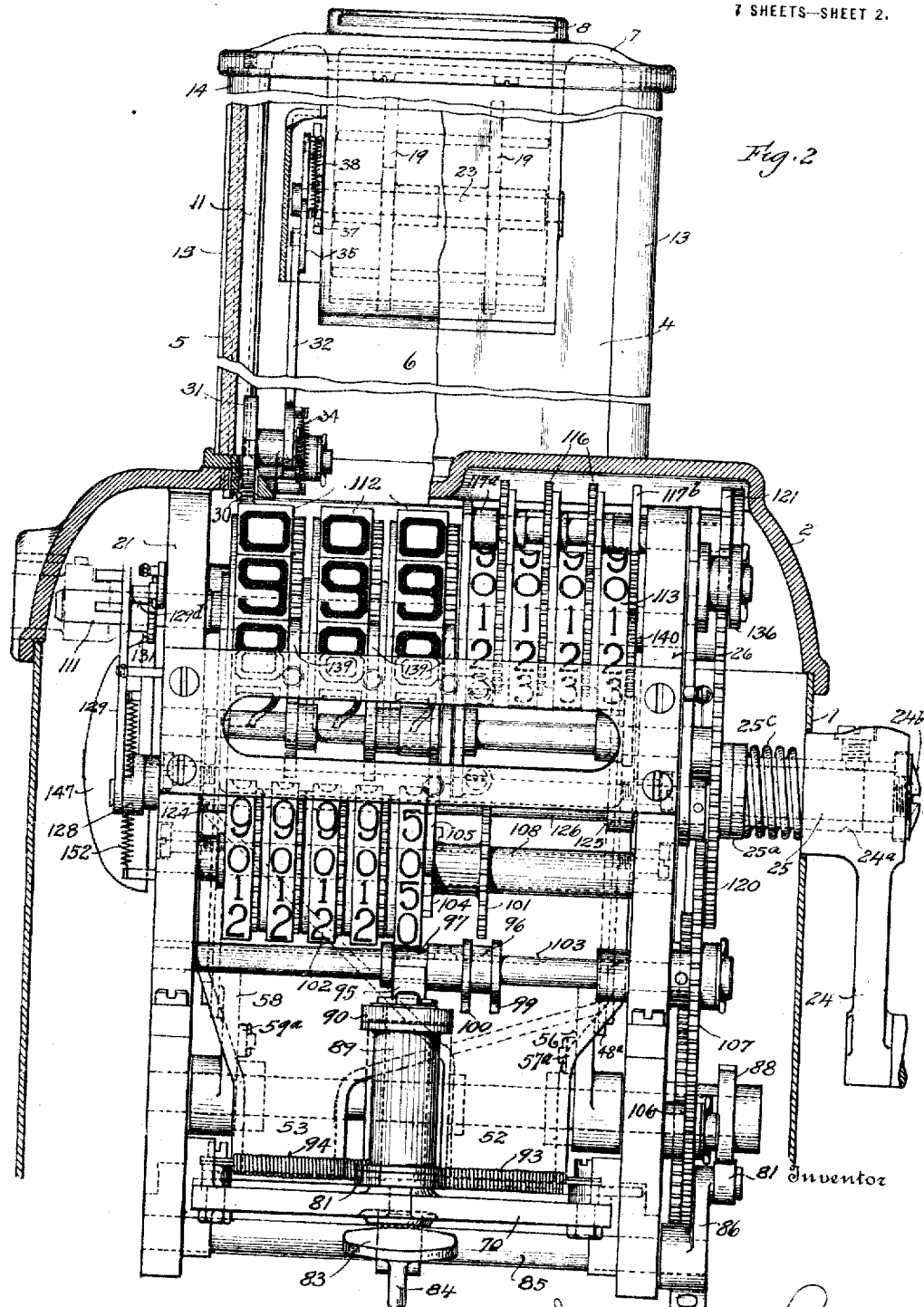
Figure 3:
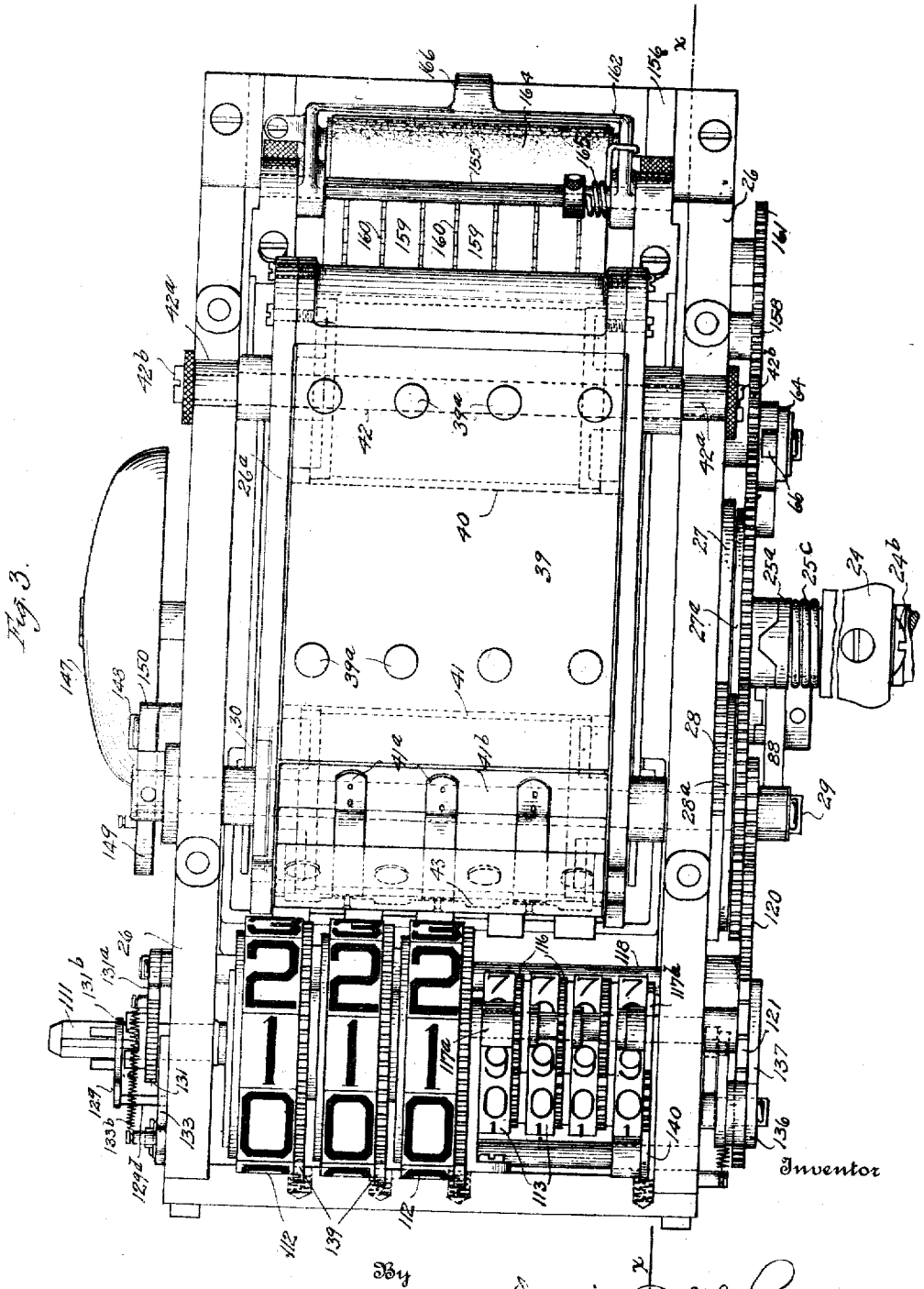
Figure 4:
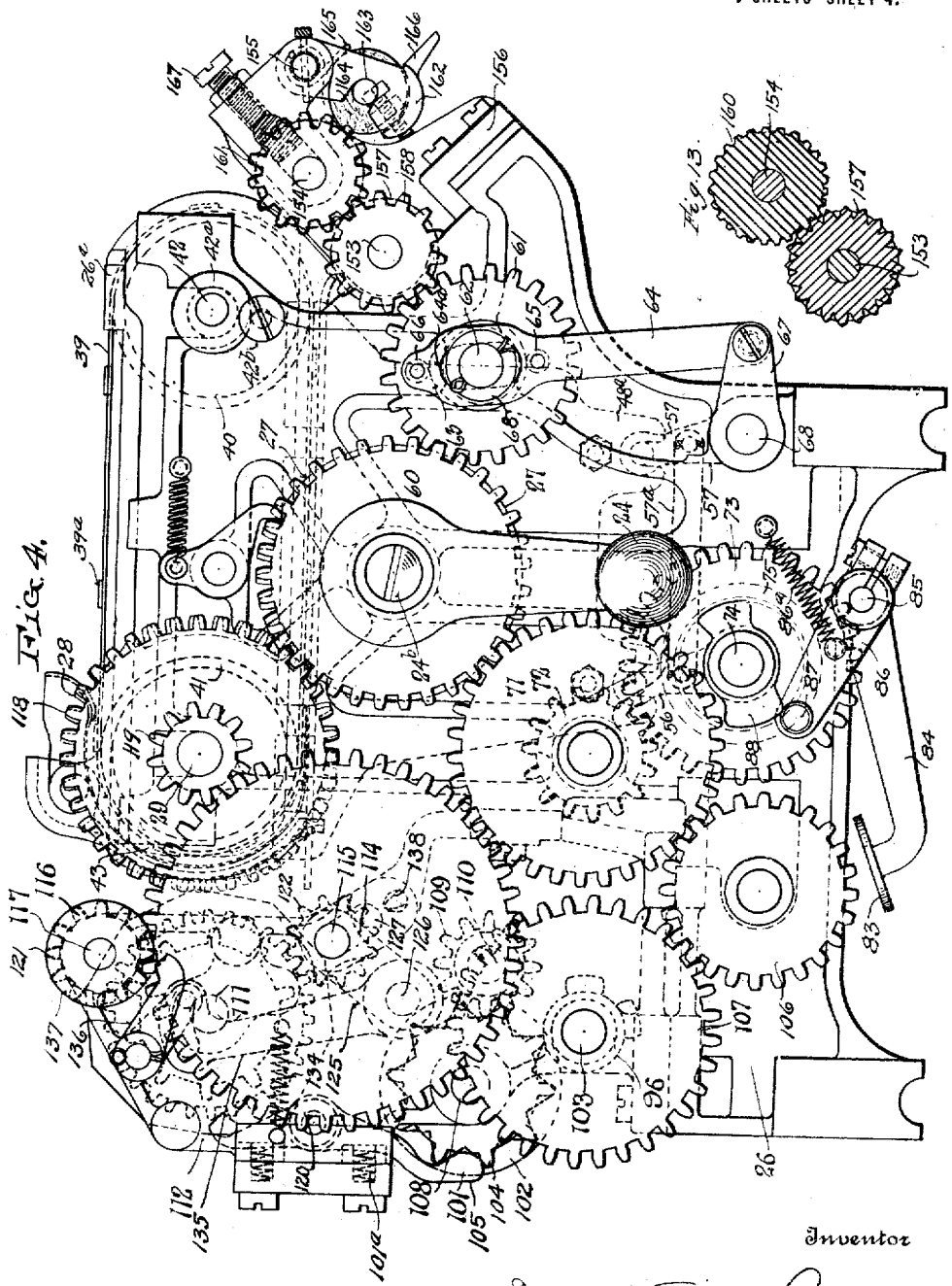
Figure 5:
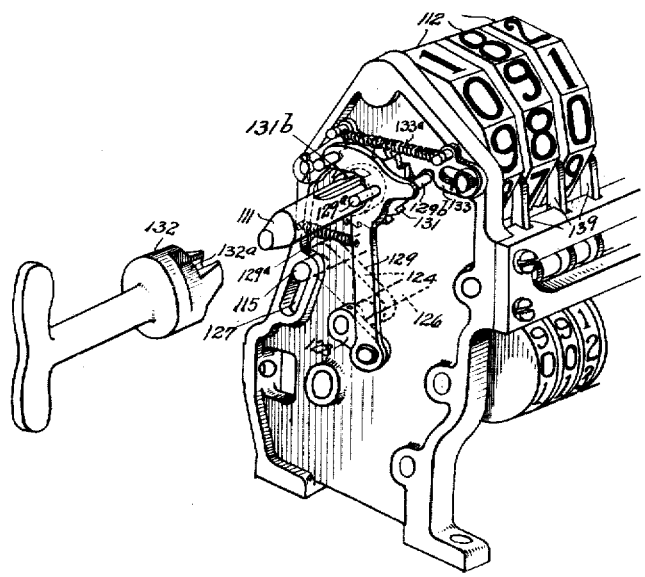
Figure 15:
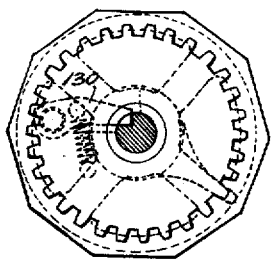
Figure 16:
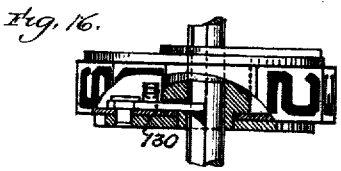
Figure 14:
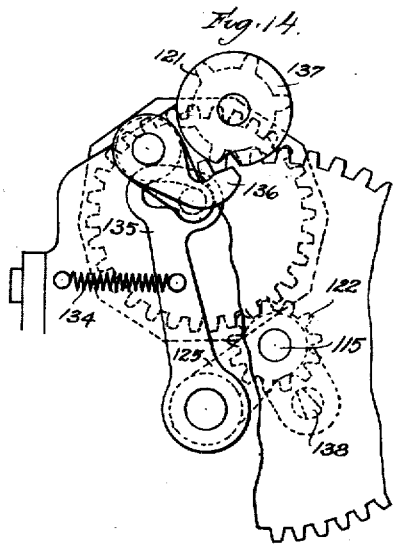

In the accompanying drawings Figure 1 is a front elevation of the mechanism taken on line X—X of Fig. 3; Fig. 2 is an end elevation of the mechanism viewed from the left with the outer casing broken away; Fig. 3 is to top plan view of the mechanism with the receiving box removed; Fig. 4 is an elevation of the various gear trains through which operative movement is transmitted from the operating handle to the various groups of the mechanism; Fig. 5 is a detail view, in perspective, of the trip-fare counter and the zero-setting mechanism; Fig. 6 is a plan view of the lower extensions of the coin tubes, in section, and the coin discharge lever and register control lever, showing the position of the cam by which the coin discharge lever is operated; Fig. 7 is a detail view, in perspective, of the coin tubes and the chutes which form an integral part thereof; Fig. 8 is a detail view of the bell mechanism; Fig. 9 is a detail elevation of the fare guard and operating mechanism; Fig. 10 shows a modified construction of the mechanim shown in Fig. 6, and including the total-cash counter and mechanism; Fig. 11 is a perspective view of the fare separator; Fig. 12 is a detail view, in section, of the coin and ticket separating plate which forms the top part of the fare separator; Fig. 13 is a sectional view of the ticket canceling devices; Fig. 14 is a detail elevation of that part of the counter zero-setting mechanism located on the front of the machine; Fig. 15 is an elevation of one of the trip-fare number wheels; and Fig. 16 is a face view of the number wheel shown in Fig. 15, with the rim broken away to show the manner of connecting the number wheel to the zero-setting shaft.

In said drawings is illustrated a machine in which my present invention is embodied in one form. The organization of the machine is made up of distinct groups of mechanism so interrelated one with the other in functions and operation as to produce an integral machine of compact construction, and in all respects adapted to the purposes of the invention. To more clearly describe the construction and operation of the various groups of mechanism, each group will be described separately as well as in its relation to the machine as a whole.

*Fare receiving and examination box.*

As is customary in the construction of fare boxes, the fare receiving and examination box is located at the top of the machine and, in view of the character of the invention, a receiving and examination box of distinctly novel construction, for mixed coin and ticket fares, has been provided. The fares are paid into the box through a single opening, are positively prevented from being removed therefrom except by the operations incident to the registration of fares. Before passing into the registering mechanism all fares are effectually displayed for visual examination. To this end, main case 1 of the fare box supports a casting 2 which forms the top cover of the fare box mechanism and, in turn, supports the receiving and examination box, which is rectangular in shape, comprising four glass walls, 3, 4, 5 and 6 which are joined together at their upper edges by casting 7 having an opening 8 to receive the fares, and secured to casting 2 by means of bolts 9, 10, 11, and 12 which, together with strips 13, 14, 15, and 16 serve to hold the glass plates rigidly in position. The bolts 9, 10, 11, and 12 preferably are covered with some kind of yieldable material, such as rubber tubing, which contacts with the edges of the glass plates and forms a close, dust-proof joint and serves as a buffer to prevent breakage of the glass. Secured to casting 7 is a plate 17 extending downward at an angle from opening 8, which serves as a guide and guard for the fares paid into the box; also secured to and suspended from casting 7 is a housing 18 which extends downward to the middle portion of the receiving box. This housing contains the fare guard which is comprised of the reel device 19 secured to shaft 23 which has bearings in the walls of the housing; the housing is also provided with a discharge opening 20. Operation of the fare guard is preferably accomplished by connecting it with the main operating mechanism of the fare box, as will presently be described. In the present embodiment of the invention, the fare box is hand-operated, and I have therefore shown an actuating device comprising crank 24 which is rotatably secured to the outer end of shaft 25 by means of sleeve 24ª, clutch 25ª and retaining screw 24ᵇ. The clutch, being under pressure of spring 25ᶜ, remains normally closed when handle 24 is operated, up to a certain point of resistance such as might be caused by an obstruction in any part of the fare box mechanism. When this point of resistance is reached, the clutch members disengage and handle 24 turns free upon shaft 25; excessive strain or breakage of the mechanism is thus avoided. Shaft 25 is rotatably secured in front frame 26, and has supported thereon, outside the frame, a mutilated gear 27 which meshes intermittently with gear 28 secured to shaft 29 which has bearings in frames 26. Gears 27 and 28 are held in proper relation with each other by means of disks 27ª and 28ª secured to the respective gears, the relation of the parts being such that shaft 29 and the parts carried thereby are actuated one-quarter turn at each operation of the machine, as will presently be described. Also secured to shaft 29, inside rear frame 26, is a four-point peripheral cam 30 coöperating with a roller 31 carried by bell-crank 32 which is pivoted at 33; the cam roller 31 being held in contact with the cam by tension of spring 34. The upper end of bell-crank 32 is connected to a plate 35 which carries a pawl 36 engaging ratchet 37 secured to shaft 23 of the fare guard; the pawl being held in engagement with the ratchet by spring 38. The relation of cam 30 with operating handle 24, through shaft 29 and the interconnecting parts, is such that the shaft and cam are rotated one-quarter turn at each full rotation of the handle which serves to actuate the fare guard one-quarter turn at each operation of the fare box. Rotation in the opposite direction of the fare guard is prevented by pawl 21 which is pivoted on stud 22 secured in the walls of housing 18. Thus, it will be seen that fares, whether coins or tickets, paid into the fare box will be delivered into the lower part of the receiving box, beyond the point where it would be possible to remove them, at each operation of the machine. Provision is also made for the passage of coins to the lower space of the receiving box by means of the open spaces in the fare guard, without operating the mechanism, as a further means of safeguarding cash fares from the instant the same are paid into the box.

*Visual examination of the fares.*

Fares paid into the receiving box may be displayed for visual examination in any suitable manner, but I prefer to use for this purpose a belt upon which the fares fall, as they are delivered from the receiving device, and upon which they are displayed for visual examination during an interval of registration, as they are carried along step by step upon the belt in the order in which they have been paid into the box. This feature of the receiving box is broadly new and is an important improvement, as examination of the fares so displayed can be made far more effective than is possible with a construction which permits the fares to accumulate in the receiving box,—all to be discharged into the registering mechanism at one time. The present construction comprises belt 39 traveling over drums 40 and 41 supported on shafts 29 and 42 which have bearings in frames 26. The belt is kept taut by means of eccentric bushings 42ª located in the bearings of shaft 42, and are held rigidly in frames 26 by screws 42ᵇ. As above described, shaft 29 is rotated one-quarter turn at each operation of the machine, and drum 41, being secured thereto, is moved one-quarter turn at each operation; with it belt 39 is drawn forward step by step with the successive operations. The fares carried upon the belt, fully exposed to view through the glass walls of the receiving box, are delivered through chute 43 to the fare separator. To insure positive delivery of the fares from the upper stretch of the belt to the fare separator, springs 41ª and a guard plate 41ᵇ are provided, which serve to hold the fares in contact with the belt until the same are fully delivered to the upper plate of the fare separating device. For convenience of manufacturing the belt mechanism is assembled in a separate frame 26ª which is supported by shafts 29 and 42 which extend through the frame into the bearings in frames 26. Under all ordinary conditions of use the plane surface of the belt serves to deliver the fares to the separator and to coact with the upper plate thereof to separate the coins and tickets, but, for purposes which will presently be described, projections may be supplied to the surface of the belt as shown, 39ª, to increase the action of the belt upon the fares.

*Fare separator.*

The character of the invention requires, in its fullest application, that the mixed coin and ticket fares first be separated and, then, that the coins be separated according to their respective denominations, and registered according to their values. To accomplish these results I have, in the present form of the mechanism, provided a separating device comprising a member adapted to receive mixed coin and ticket fares and having apertures of such a character and so arranged as to permit the passage therethrough of coins but to prevent the passage of tickets. Coöperating with the apertured member of the separating device is a member having movement relatively to the supporting surface thereof and adapted to act upon the fares upon said supporting surface and move them along the same until the coins pass through the openings therein and the tickets are discharged beyond the end thereof. This movable member of the separating device may also, if desired, be of such a character that it will serve to deliver the fares to the separating device, and further, it may be so arranged as to display the fares as they are being delivered to said separating device. Arranged below the apertured member of the separating device are other devices to act upon the coins and separate them according to their denominations, the whole fare coins being delivered to suitable positioning devices from which they are discharged in such a manner as to engage the actuating member of the registering devices and cause the value of the coin to be registered. The fractional fare coins, that is the pennies, are discharged into a separate receptacle. This mechanism may take various forms, but in the present embodiment of the invention I have provided a suitable fare register which, as here shown, comprises a plurality of apertured plates 45, 46, and 47, and a solid plate 48 which are supported in a rectangular frame 48$^a$. The upper plate 45 is approximately as wide as belt 39 and is horizontally disposed along the lower stretch thereof, coöperating with the belt in separating the coins and tickets. The apertures in plates 45, 46 and 47 are graduated according to the respective diameters of United States nickles, dimes and pennies, which in the present construction are the coins to be received in the fare box. The apertures in plate 45 are large enough to permit coins of the three sizes specified to pass through them to plate 46 in which the apertures are large enough for pennies and dimes but too small for nickles. Plate 47 has apertures large enough for dimes to pass through them to plate 48, but too small for pennies; thus, it will be seen that separation of the coins takes place as the coins move by gravitation and momentum received from the operation of the machine, from the top to the bottom plates of the separator. The nickles are separated from dimes and pennies by plate 46; and pennies from dimes by plate 47. Pins 46$^a$ and 47$^a$ are located in plates 46 and 47 respectively to guide the coins into the apertures therein; and baffle plates 48$^b$ are located above the plates to cause the coins to be delivered upon the plates at a point farthest removed from the discharge openings of the separator. In frame 48$^a$ of the separator are graduated openings 49, 50, and 51 through which the coins are discharged from the separator; and adjacent to the separator, at both ends thereof, are receptacles 52, 53, 54, and 55 which receive the fares as the same are discharged from the respective plates of the separator. Plate 46 extends beyond frame 48$^a$ into the coin chute of receptacle 52; plate 48 into coin chute of receptacle 53; and plate 47 into the opening of receptacle 54. The fare separator is mounted upon four rock-arms 56, 57, 58, and 59, one at each corner of rectangular frame 48$^a$. Movement is imparted to the rock-arms from crank 24, through gear 60, the hub of which forms one of the clutch members 25$^a$, which meshes with gear 61 supported upon stud 62 secured in frame 26. Secured to the outer face of gear 61 is an eccentric cam 63 which is connected by means of link 64 and rollers 65 and 66 to rock-arm 67 secured to shaft 68; link 64 being provided with an elongated slot 64$^a$ to receive stud 62 which passes through the link and holds the same in proper relation with cam 63 by means of a retaining collar and cotter pin. When crank 24 is operated, movement is imparted, through the interconnecting parts described, to rock arms 57 and 59 which are pinned to shaft 68, and through the rock arms to the fare separator which receives therefrom an oscillating, vibratory movement. Arms 56 and 58 work freely upon shaft 74, and are connected to arms 57 and 59 by means of links 57$^a$ and 59$^a$. Fares in the separator are thus kept constantly in motion, when the fare box is operated; the coins finding their way by gravitation and momentum imparted thereto from the shaking movements of the separator, to the respective levels of the fare separating plates, and from the plates into the fare receptacles and coin registering tubes. Separation of the coins being accomplished as described, nickles are discharged from plate 46 into registering tube 52; dimes from plate 48 into registering tube 53; and pennies from plate 47 into coin receptacle 54. Ticket fares are swept along upon plate 45 by the travel of belt 39 across the face of the plate, through the ticket canceling devices, into receptacle 55.

While the coin and ticket separating device will in ordinary conditions operate to satisfactorily separate the coins and tickets when a flat plate 45 is used and provided with apertures opening directly through the same there are circumstances under which the corner or end of a ticket may enter one of the openings and cause the ticket to be forced through the opening by the action of the movable part. To avoid the possibility of a ticket passing through an aperture under any circumstances I prefer to provide each aperture with a guard which will elevate the end, or corner, of any ticket which may enter the same, to the level of the plate to permit it to be carried past the opening by the movable part of the separator. These guards are shown in Figs. 11 and 12 as deflectors extending from the rear edge of the openings downwardly and forwardly beneath the openings. It will be obvious that a guard of this kind will be engaged by the edge of a ticket which has a tendency to enter the opening and will prevent the edge of the ticket from catching under the edge of the opening, and will positively prevent the tickets from passing through the opening. The coins being of a diameter of less than the width of the openings will drop flat on the deflectors and will then slide down the same through the forward part of the openings and thus be discharged onto the plate 45 of the coin separator.

Special provision has been made in the design and construction of the machine to prevent clogging or obstructing the mechanism in any way, either by the normal movement of coins and tickets through the mechanism, or by mutilated coins, or foreign objects dropped into the box. To this end, belt 39 is provided with projections 39ª which prevent clogging of fares in chute 43, or between plate 45 and the belt, by positively engaging the edges of the coins and tickets and moving them along until separation thereof takes place upon plate 45. To this end also, the openings 49 and 50 in frame 48ª of the fare separator are graduated approximately to the respective thickness of nickels and dimes, so that mutilated coins, or foreign objects thicker than coins will be prevented from passing into the coin registering tubes where the same might interfere with the operation of the machine. Provision is also made in the fare separator to eliminate pennies, or other coins of a given size, from coins to be registered. This is accomplished by slanting plate 47 in the opposite direction from plates 46 and 48, away from the coin registering tubes, and discharging the pennies therefrom into a separate receptacle from which they cannot be removed except by authorized persons. This is done to overcome the practice of false registration accomplished by changing the diameters of coins to cause the same to register less than their value,—e. g.; enlarging the diameter of a dime by flattening to cause it to register as one cent, or reducing the diameter of a nickel to cause it to register as one cent. This practice has been the source of considerable loss to railway companies using registering fare boxes and it is, therefore, important that provision should be made to prevent it. While elimination of pennies is accomplished in various ways in fare boxes of other types, I have employed in the present construction a novel, and exceedingly simple and effective mechanism which makes fraudulent registration of coins by the method above described impossible.

*Coin registering mechanism.*

As above described, the devices to receive the coins to be registered from the separator, have very limited capacity; in fact, in the normal operation of the fare box, they merely serve to position the coins for registration, and are not intended, therefore, to receive and contain any considerable accumulation of coins, although a limited number of coins may be superposed therein before being registered. The coin positioning devices may be of any suitable construction, but I prefer to use a plurality of tubes 52 and 53 comprised in an integral part which is supported between frames 26 by means of four shoulder screws. The tubes have upwardly extending chutes 52ª and 53ª respectively which extend to plates 46 and 48 of the separator to receive the coins therefrom. The coins are positioned in the tubes by gravitation, and are registered therefrom by an organization of mechanism comprising a coin discharge lever, register control mechanism, and a total-cash counter, the detail construction and operation of which will presently be described. The registering mechanism is broadly new and of novel construction. The "coin hopper", common to all registering fare boxes of earlier makes which have come into commercial use, has been eliminated; the coin tubes of limited storage capacity being used instead which, with the further provision of requiring the fare box to be operated once for each fare paid therein, whether coin or ticket, prevents accumulation of fares in the mechanism and, therefore, any possibility of the coins clogging and breaking the mechanism. The mechanism also differs widely from earlier devices in that no selective mechanism is required to deliver the coins to the registering mechanism. This function is performed in a simple, direct manner, in the most part by gravitation, by mechanism which does not require close adjustment and which cannot be easily broken or rendered inoperative, being free, therefore, of the difficulties experienced in this respect with fare boxes of other types. The present invention has the further advantage of having every fare registered immediately as paid the importance of which, in connection with service inspection, is generally recognized.

A coin registering mechanism of any suitable character may be employed and in the particular embodiment of the invention here shown the detail construction and operation of the coin registering mechanism is as follows: gear 60 meshes with gear 71 which has secured to its inner face gear 72 which meshes with gear 73 secured to shaft 74. Shaft 74 has bearings in frames 26, and has secured thereto, between frames 26, a cylindrical cam 75 which engages coin-discharge lever 77 by means of a roller 76 secured to the upper, middle portion thereof; lever 77 being pivoted to base plate 70 by means of stud 78. When crank 24 is operated movement is imparted, through the gear train above described, to cam 75, and through the cam, an intermittent movement is transmitted to discharge lever 77, causing projections 79 and 80 thereof to pass through the clearance spaces under tubes 52 and 53 respectively, at each alternate operation of the machine. Coins positioned in the tubes are thus moved one at a time into engagement with register control lever 81. At the end of the movement the coins lie within discharge opening 82 upon the flat surface 83 of drop arm 84, the arm being secured to shaft 85 which has bearings in base plate 70. One end of shaft 85 extends beyond frame 26 and has secured thereto an arm 86, the free end of which is provided with a roller 87 which contacts with a compound cam 88 secured to shaft 74. A spring 86ª, attached to arm 86, holds arm 84 in raised position with plate 83 thereof closing discharge opening 82 and having its upper surface flush with the surface of plate 70 at all times except when the arm is forced down by action of cam 88 to discharge a coin through the opening. The register control mechanism is an integral part comprising lever 81, sleeve portion 89, and an upper arm 90. The part is pivoted upon vertical stud 91 which is rigidly secured in plate 70, and is normally held in position, by tension of springs 93 and 94, with lever 81 extending centrally between the coin tubes. Arm 90 is provided with a yoke 95 which engages the counter actuator 96 by means of a groove 97 formed in one end thereof. The actuator is an integral part sleeved upon shaft 103, and has formed thereon, at the end opposite groove 97, two sets of gear teeth 99 and 100 by means of which the units wheel of the total-cash counter is actuated; gear 99 consisting of one tooth, and gear 100 of two teeth, the purpose of which will presently be described. Actuator 96 is splined upon shaft 103 and rotates therewith and, also, has limited lateral movement thereon. Shaft 103 has bearings in frames 26, and has secured to its end, projecting through front frame 26, a gear 107 which is operated through the train of gears 60, 71, 106 and 107; the relation of the parts being such that shaft 103 and the counter actuator 96 are actuated one complete turn at each operation of the machine. Total-cash counter 102 is of well known Geneva lock construction. The number wheels are loosely mounted on shaft 108, and are provided with transfer wheels 109 carried by shaft 110 which is rigidly secured in frames 26. Actuating gear 101 for the 5¢-units wheel of counter 102 is spaced some distance from the number wheel to provide clearance space for gears 99 and 100, the units wheel being normally held in alinement by lining disk 104 and pawl 105. When a nickel is discharged from coin tube 52, the coin engages register control lever 81, forcing the lever away from the tube, and causing the counter actuator to be moved to the left the required distance to bring gear 99 into registering alinement with gear 101 of the units wheel of counter 102 and, as the operation is continued, the single tooth of gear 99 passes through mesh with gear 101, and one 5¢-unit is registered upon the counter. In like manner when a dime is discharged from tube 53, gear 100 of the actuator is moved into registering alinement with gear 101, the two teeth of the gear meshing therewith and causing two 5¢-units to be registered upon the total-cash counter. The coins as they are discharged from the coin tubes are moved within discharge opening 82 upon the flat surface 83 of drop arm 84 which, when the arm is in raised position, lies flush with the upper surface of plate 70. At the end of the movement the coins come to a position of rest upon plate 83, and are held in raised position upon plate 83 above the opening 82 until the actuating gear has passed through mesh with gear 101, and the value of the coin in 5¢-units has been registered upon the total-cash counter. During the latter part of the registering operation, after the counter has been fully actuated, drop arm 84 is moved to its lower position by the action of cam 86, and the coin on plate 83 falls into coin box 98. These movements are repeated at each operation of the machine, the coins being removed alternately from coin tubes 52 and 53. When there is no coin in registering position in the tubes, when the fare box is operated, register control lever 81 remains stationary and no registration is effected on the total-cash counter.

Under certain conditions of fare collecting, such as on interurban railway lines and city railways operated on the zone system, it is sometimes desirable to provide the fare box with mechanism to register a greater variety of coins than is required in the regular fare box for ordinary use. To this end, I have shown in Fig. 10 a modified construction of the coin tubes and total-cash registering mechanism, in which provision is made to register United States nickels, dimes, and quarters; nickels and quarters, being the two coins of largest size, are delivered from the fare separator into a single coin tube 52ª from which they are removed and registered in the manner described. Dimes are delivered into coin tube 53ª and registered therefrom in the regular manner. The counter actuator 96ª is provided with three sets of gear teeth, 99ª 100ª and 101ª which have respectively one, two, and five teeth in each set. When a dime is registered from tube 53ª, the gear actuator having two teeth meshes with gear 101 and two 5¢-units are registered on the total-cash counter; when a nickel is registered from tube 52ª, the one-tooth gear meshes with gear 101 and one 5¢-unit is registered on the counter; and when a quarter is registered from tube 52ª the five-tooth gear meshes with gear 101 and five 5¢-units are registered.

*Trip-fare register and total-fare register.*

The requirements of a complete registering device for all kinds of fares are provided for in the present invention. The use of supplemental fare registers for tickets, transfers, etc., is, therefore, rendered unnecessary, as in addition to the total-cash counter used in the fare box, a trip-fare register and a total fare register are provided so that fares of every kind, including fares not paid into the box, such as transfers, coupons, etc., can be registered, nevertheless, direct on the fare box counters, and all data usually obtained through the use of supplemental fare registers, can be obtained therefrom. This not only simplifies the fare register equipment and effects substantial savings in the cost and maintenance of the same, but it improves the conditions of work for conductors by eliminating details of operation. It also tends to improvement of car schedules by facilitating the movements of passengers and the general saving of time. These are factors of primary importance to railway companies as they lead to greater economy and efficiency in the entire work of fare collecting and accounting and in the important relation it bears to general railway operation.

The counters used, considered separate and apart from the various combinations of the mechanism, are for the most part, of well known construction. Trip-fare counters, total-fare counters, and total-cash counters are all old in the fare register counters art, and their novelty in the present invention is limited to specific details of construction and, in a broader sense, to the various organizations and combinations of the mechanism of which the counters, singly and collectively, form an essential part, and in which relation they serve a new and useful purpose. The different types of counters could not be used interchangeably, as each type and the several types, are all essential to accomplish the full purpose of the invention. A trip-fare counter within the meaning of the invention is essentially a counter actuated at each operation of the registering mechanism, and must be capable of being set-at-zero at intervals of operation, as at the ends of trips, or other periods of work; a total-fare counter, in the same sense, is a non-zero counter actuated at each operation of the machine and adapted to record the total of registrations during a longer period of time, as a month or year; and a total-cash counter, within the meaning of the invention, must be capable of computing the value of the coins registered through the fare box. Both the trip-fare counter and the total-fare counter register all the fares that are received by the box and may, therefore, be characterized as passenger registers.

To this end, shaft 111 is provided with two sets of number wheels, viz.; a trip-fare register 112 and a total-fare register 113. These counters are of the usual construction, but have certain modifications to adapt the same to the purposes of the present invention. The number wheels of counter 112 are provided with transfer gears 114 supported on shaft 115; and the number wheels of counter 113 are provided with transfer gears 116 supported on shaft 117 which has bearings in front frame 26 and in brackets 117ª. One end of shaft 117 projects through front frame 26 and has secured thereto gear 121 which forms part of the gear train 60, 118, 119, 120 and 121 through which movement is transmitted from crank 24 to shaft 117, and to the counter actuator 117ᵇ which is secured to shaft 117 and by means of which the total-fare counter 113 is actuated. Shaft 115 also projects through front frame 26 and has secured thereto gear 120; and secured to the shaft between frames 26 is a counter actuator gear 122 by means of which the trip-fare counter is actuated. It will thus be seen that both counters 112 and 113 are operated direct from crank 24, the relation of the parts being such that each counter receives one unit of registration at each turn of the crank.

*Counter zero-setting mechanism.*

As above stated, it is essential to the full purposes of the invention that the trip-fare counter be capable of being set-at-zero at any desired intervals. To this end, therefore, shaft 115 is supported in a yoke formed by arms 124 and 125 which are rigidly secured to shaft 126. Clearance slots 127 are provided in frames 26 to permit shaft 115 and actuating gear 123 and transfer gears 114 carried thereon to be moved away from counter 112 sufficient distance to cause the gears to pass out of mesh with the gears of the counter, so that the number wheels of the counter may be rotated freely with shaft 111 during the zero-setting operation. Shaft 126 has bearings in frames 26 and has secured to one end thereof, projecting through rear frame 26, an arm 128 to which is connected a latch 129 which is held in contact with shaft 111 by means of spring 129ª; the spring serving to hold the shaft, 115, in raised position with the gears thereon in full mesh with the number wheels of counter 112; and the latch serving to prevent the shaft springing away from the counter when the parts are operated. Shaft 111 is splined, as shown in Fig. 5, and the number wheels of counter 112 are provided with pawls 130 which engage the shoulder of the spline when the shaft is rotated to set the number wheels in the zero position. Shaft 111 is further provided with a ratchet 131 and pawl 131ª which prevent rotation of the shaft in the wrong direction. A wrench, 132, having a conical shaped end, is employed to engage the projecting end of shaft 111 to set the trip-fare counter at zero. When the wrench is applied to the shaft its tapered end first contacts with pin 129ª secured in latch 129, and forces the latch back, out of engagement with shaft 111. As the wrench is further advanced on the shaft, pin 129ᵇ enters groove 132ª of the wrench; as the wrench is then turned to the left the pin is cammed out of the groove, and latch 129 is forced upward, causing shaft 126 to be rotated sufficiently to force shaft 115 to the bottom of slots 127 in which position the gears carried by shaft 115 are fully out of mesh with the gears of the number wheels of counter 112. Wrench 132 is then pressed home upon shaft 111 into engagement with notches 131ᵇ, formed in the hub of ratchet 131, and is then turned to the right one complete turn rotating the shaft with it and causing the number wheels thereon to be moved to the zero position. At the end of the operation, a pawl 133 engages the shoulder of the spline in shaft 111 and prevents further movement thereof. Pawls 131ª and 133 are joined together by a spring 133ᵇ. When the wrench is withdrawn from shaft 111, shaft 115 and the parts thereon are restored to normal position by tension of spring 134, connected to arm 135 which is secured to the opposite end of shaft 126 projecting through front frame 26; latch 129 is then drawn into locking engagement with shaft 111, and pawl 133 is raised out of engagement with the spline of the shaft by means of pin 129ᵈ, leaving the parts in proper relation for registering operations upon the counter and for the next zero-setting operation. Arm 135 is connected with a lining pawl 136 which engages a notch in disk 137 secured to shaft 117, and holds gear 121 in alinement to move in and out of mesh with gear 120 at the beginning and end of the zero-setting operation. The transfer gears carried on shaft 115 are held in alinement, when out of mesh with the number wheels of counter 112, by a V-shaped bar 138 which is supported in frames 26. The number wheels of counter 112 are held in alinement by pawls 139, and the units wheel of counter 113 is held in alinement by pawl 140.

Bell operating mechanism.

To further serve the purposes of a combined fare box and fare register, bell mechanism has been provided to signal the completion of each registration. A bell 147 is secured to rear frame 26 and is provided with a strike-arm 149, pivoted at 148, and having a trip-arm 150 extending into the path of pins 151 which are secured in the outer face of cam 30; the bell striker being under tension of spring 152. It will thus be seen that at each full turn of operating crank 24 the bell striker is actuated by contacting with one of the pins 151, and the bell is sounded to indicate that a registration of a fare has been made on the fare box.

Ticket canceling mechanism.

In order that ticket fares may be rendered invalid immediately as the same are registered, ticket canceling devices are provided as an integral part of the fare box mechanism. The canceling devices comprise shafts 153, 154 and 155, supported in a supplemental frame 156 secured to main frames 26. Shaft 153 has secured thereon a series of perforating disks 157 and, at one end thereof extending through frame 156, a gear 158 which meshes with gear 61. Shaft 154 has secured thereon a series of felt washers 159, with spaces 160 between the washers registering with disks 157. Secured to the outer end of shaft 154 is a gear 161 which meshes with gear 158. Secured to shaft 155 is a yoke 162 supporting in open bearings 163, an ink roller 164 which is held in contact with felt rollers 159 by tension of spring 165. The yoke 162 is provided with a finger piece 166 by means of which the yoke may be lifted away from the ink roller when it is desired to remove the same or to supply ink thereto. Shaft 154 is provided with screws 167 by means of which canceling roller 159 may be adjusted relative to roller 157 to regulate the depth of perforation of the ticekts as they pass through the canceling devices. Through the gear connections with the main operating mechanism of the fare box the canceling rollers are in continuous rotation when the fare box is operated; the tickets being delivered thereto from the coin and ticket separating plate 45 of the fare separator, and delivered therefrom into the ticket storage box 55.

Summary of operation.

Detail description of the construction and operation of the various groups of mechanism which make up the integral machine of the present invention, having been made, a brief summary of the general construction and operation of the machine is here given. While the invention comprises important groups of mechanism of novel construction and performing new and useful functions, the greater importance of the invention, in a broad sense, resides in the combination of these mechanisms in an integral machine actuated by a single operating mechanism. In the present construction the machine is operated manually by a handle applied to the main drive shaft of the mechanism, but it is obvious that operating movement can be transmitted to the mechanism by other well known devices and from other sources of power.

When a fare, whether coin or ticket, is paid into the fare box, the machine is immediately operated which causes the fare to be delivered into the receiving and examination box, upon the display belt; the fare being fully exposed for visual examination as it is carried along step by step with the travel of the belt, during the interval of a number of operations of the fare box. As sections of the belt pass from the upper to the lower travel thereof, the fares are delivered one by one, in the order in which they have been paid into the box, to the fare separator. Ticket fares are moved across the upper plate of the fare separator by the combined action of the lower stretch of the belt and the shaking movement of the separator, into the ticket canceling devices, and delivered therefrom into the ticket storage box. Full fare coins gravitate through the apertures in the various plates of the separator, accelerated by the vibratory movements thereof, into the coin positioning devices, having been separated according to denomination by the graduated apertures in the separator plates. Pennies, through the same operations, are segregated from full-fare coins and are delivered, without being registered, into a separate coin box. Mutilated coins, or foreign objects larger than coins, are prevented from passing through the separator by the graduated discharge openings therein. The full-fare coins are registered from the respective coin positioning devices, on the total-cash counter; the amount of registration being determined in each instance by the number of 5¢-units represented by the respective values of the coins. When coins of but one denomination are registered from a positioning device, the location of the positioning device relative to the register control mechanism may determine the amount of registration effected on the counter, but when coins of more than one denomination are registered from the same positioning device, the diameter of the coin in each instance will determine the amount of registration upon the total-cash counter. After the coins have been registered, they are discharged from the mechanism and delivered into an open money drawer where the same are accessible to the conductor. Also, at each operation of the fare box one unit is registered on the trip-fare counter and on the total-fare counter which record, respectively, the number of fares registered on each trip, and the total number registered during a longer interval of time, as a month, or year. Near the end of each registering operation the register bell is actuated to indicate the completion of a fare registration.

It will be apparent from the descriptions of operation, that every function of the fare box, save that of setting the trip-fare counter in the zero position, may occur within a single registering operation; although repeated operations of the registering mechanism are necessary to complete registration, separation, and delivery of any single fare. It will also be apparent that the registering operations will be somewhat in advance, in each instance, of the movement of the fare through the various mechanisms of the fare box. This makes it necessary to clear the mechanism of fares at certain intervals, such as at the end of periods of work, when one conductor is relieved by another. To clear the mechanism of fares, the zero wrench is positioned upon the zero-setting shaft, and the transfer gears of the trip-fare counter are moved out of mesh; the fare box may then be operated without effecting further registration upon the trip-fare and total-fare counters, but coins remaining in the mechanism when the box is cleared will be registered on the total-cash counter the same as in the regular operation of the fare box.

While I have shown and described my invention in a preferred form of construction, it will be understood that I do not desire to be limited to the exact construction shown, as various modifications will occur to one skilled in the art. Further it will be understood that the invention is not limited to service as a fare collector on common carriers, but that it may be used either in the exact form here shown, or in various modifications of this form, for the collection of money or fares in various places and for various purposes; and that the term "fare" as herein used is intended to include coins, checks, tickets, or other tokens of value which may be paid into the fare box for any purpose whatever.

Having thus fully described the invention, what I claim as new and desire to secure by Letters Patent is:

1. In a registering fare box for coins and paper tickets, a passenger register, an operating device connected with said register to cause a fare to be registered thereon upon each operation of said device, a device to separate coins from paper tickets, a device to separate coins according to their denominations, and connections between said separating devices and said operating device to cause said separating devices to be operated on each registration of a fare.

2. In a registering fare box, a passenger register, an operating device connected with said register to cause a fare to be registered upon each operation of said device, a device to separate coins according to their denominations, a connection between said separating device and said operating device to cause said separating device to be operated upon each registration of a fare, and means to disconnect said operating device from said register to permit said separating device to be actuated by said operating device independently of said register.

3. In a registering fare box for coins and paper tickets, a passenger register, an operating device connected with said register to cause a fare to be registered thereon upon each operation of said device, a device to separate coins from paper tickets, and a connection between said separating device and said operating device to cause said separating device to be operated on each registration of a fare.

4. In a registering fare box for coins and paper tickets, a passenger register, an operating device connected with said register to cause a fare to be registered thereon upon each operation of said device, a device to separate coins from paper tickets, a device to separate coins according to their denominations, a coin controlled register to register the value of said coins, connections between said separating devices and said operating device to cause said separating devices to be operated on each registration of a fare, and an operative connection between said coin register and said operating device.

5. In a registering fare box for coins and paper tickets, a passenger register, an operating device connected with said register to cause a fare to be registered thereon upon each operation of said device, a device to separate coins from paper tickets, a device to separate coins according to their denominations, connections between said separating devices and said operating device to cause said separating devices to be operated on each registration of a fare, and means to disconnect said passenger register from said operating device to enable said separating devices to be operated independently of said passenger register.

6. In a registering fare box, a passenger register, an operating device connected with said register to cause a fare to be registered thereon upon each operation of said device, a device to separate coins according to their denominations, a connection between said separating device and said operating device to cause said separating device to be operated on each registration of a fare, a coin registering device to register the value of the coins, an operative connection between said coin registering device and said operating device, and means to disconnect said passenger register from said operating device to permit said separating device and said coin register to be operated by said operating device independently of said passenger register.

7. In a mechanism of the character described, a coin separating device adapted to receive coins of different denominations and having means to separate said coins according to their denominations, a part having a supporting surface, means to place coins of one denomination in one position on said surface and coins of another denomination in another position on said surface, means to separately remove coins of both denominations from said positions, a registering mechanism, and an actuating device for said registering mechanism arranged to be engaged and actuated by a coin which is removed from either of said positions.

8. In a mechanism of the character described, a coin supporting part, means to place coins of one denomination in one position on said part and to place coins of another denomination in another position on said part, means to separately remove coins of both denominations from said part, a registering mechanism, and an actuating device for said registering mechanism arranged to be engaged and actuated by a coin which is being moved from either of said positions.

9. In a mechanism of the character described, a coin supporting part having a discharge opening, means to position coins of one denomination on one side of said opening and to position coins of another denomination on the other side of said opening, means to separately move coins from either of said positions toward said discharge opening, a registering mechanism, and an actuating device for said registering mechanism arranged to be engaged and actuated by a coin moved toward said discharge opening from either of said positions.

10. In a mechanism of the character described, a coin separating device adapted to receive coins of different denominations and having means to separate said coins according to their denominations, a part having a supporting surface and provided with a discharge opening, means to position coins of one denomination on one side of said opening and coins of another denomination on the other side thereof, other means to separately move coins from either of said positions toward said discharge opening, a registering mechanism, an actuating device for said registering mechanism arranged to be engaged by a coin moved toward said discharge opening from either side thereof.

11. In a mechanism of the character described, a coin separating device adapted to receive coins of different denominations and having means to separate the coins according to their denominations, a part having a supporting surface provided with a discharge opening, chutes to receive coins from said separating device and guide them into predetermined positions on the respective sides of said discharge opening, and means to separately move said coins from both of said positions toward said discharge opening.

12. In a mechanism of the character described, a coin separating device adapted to receive coins of different denominations and having means to separate the coins according to their denominations, a part having a supporting surface provided with a discharge opening, chutes to receive coins from said separating device and guide them into predetermined positions on the respective sides of said discharge opening, means to separately move said coins from both of said positions toward said discharge opening, registering mechanism, and an actuating device for said registering mechanism arranged to be engaged by a coin moved toward said discharge opening from either side thereof.

13. In a mechanism of the character described, a coin separating device having means to separate coins according to their denominations, a part having a supporting surface and provided with a discharge opening, tubular structures arranged to receive coins from said separating device and position them on said supporting surface on opposite sides of said discharge opening, the lower ends of said structures being spaced away from said supporting surface to permit the passage of single coins, means to move the coins laterally from beneath said tubular structures to said discharge opening, and an operable part arranged to be engaged by the coins as they are moved toward said opening.

14. In a mechanism of the character described, a coin separating device having means to separate coins according to their denominations, a part having a supporting surface and provided with a discharge opening, tubular structures arranged to receive coins from said separating device and position them on said supporting surface on opposite sides of said discharge opening, the lower ends of said structures being spaced away from said supporting surface to permit the passage of the coins, an ejector having parts arranged to move between the respective tubular structures and said supporting surface and to move the coins from the respective structures toward said discharge opening, and an operable device arranged to be engaged by a coin moved from either structure toward said discharge opening.

15. In a mechanism of the character described, a part having a supporting surface and provided with a discharge opening, a structure having a plurality of tubes to receive coins and position them on opposite sides of said discharge opening, said structure being spaced from said supporting surface, an ejecting device having parts movable alternately between the respective tubes and said supporting surface to engage said coins and move them toward said discharge opening.

16. In a mechanism of the character described, a part having a supporting surface and provided with a discharge opening, tubular structures arranged to receive coins and to position them on said supporting surface on opposite sides of said discharge opening, the lower ends of said tubular structures being spaced away from said supporting surface to permit the passage of coins, and an ejector mounted for movement over said supporting surface and having parts arranged to pass between the respective tubular structures and said supporting surface and discharge the coins from any of said positions through said discharge opening.

17. In a mechanism of the character described, a part having a supporting surface, tubular structures arranged to receive coins and guide them to different positions on said supporting surface, the lower ends of said structures being spaced from said supporting surface to permit the lateral discharge of the coins, and an oscillating ejector mounted for movement over said supporting surface and having parts arranged to pass between the respective tubular structures and said supporting surface and discharge the coins from either of said positions.

18. In a mechanism of the character described, a part having a supporting surface and provided with a discharge opening, tubular structures arranged to receive coins and to position them on said supporting surface on different sides of said discharge opening, the lower ends of said structures being spaced away from said supporting surface to permit the discharge of the coins, and an oscillating ejector mounted for movement over said supporting surface and having parts arranged to pass between the respective tubular structures and said supporting surface to move the coins thereon toward said discharge opening.

19. In a mechanism of the character described, a part having a supporting surface and provided with a discharge opening, means to guide coins to positions on said supporting surface on different sides of said discharge opening, and an ejector mounted for movement over said supporting surface and adapted to engage coins in either of said positions and move the same toward said discharge opening.

20. In a mechanism of the character described, a part having a supporting surface and provided with a discharge opening, means to guide coins to positions on different sides of said discharge opening, and an oscillating ejector mounted for movement over said supporting surface and having parts adapted to engage the coins in either of said positions and move them separately to said discharge opening.

21. In a mechanism of the character described, a part having a supporting surface and provided with a discharge opening, means to guide coins to positions on different sides of said discharge opening, an oscillating ejector mounted for movement over said supporting surface and having a bifurcated end portion, the arms of which are arranged to engage the coins on the respective sides of said discharge opening and move the same separately toward said discharge opening.

22. In a mechanism of the character described, a part having a supporting surface and provided with a discharge opening, means to guide coins to positions on different sides of said discharge opening, an oscillating ejector mounted for movement over said supporting surface and having a bifurcated end portion, the arms of which are arranged to engage the coins on the respective sides of said discharge opening and move the same separately toward said discharge opening, registering mechanism, and an actuating device for said registering mechanism arranged adjacent to said discharge opening in a position to be engaged by each coin as it is moved toward said discharge opening.

23. In a mechanism of the character described, a part having a supporting surface and provided with a discharge opening, means to guide coins to positions on different sides of said discharge opening, an oscillating ejector mounted for movement over said supporting surface and having parts adapted to engage the coins in either of said positions and move them separately to said discharge opening, registering mechanism, and an actuating device for said registering mechanism arranged adjacent to said discharge opening in a position to be engaged by each coin as it is moved toward said discharge opening.

24. In a mechanism of the character described, a part having a supporting surface and provided with a discharge opening, means for positioning coins on said surface adjacent to said discharge opening, a device to move said coins separately from said position toward said discharge opening, a register actuating device so arranged with relation to said first mentioned device that a coin moved toward said opening by said first mentioned device will establish an operative connection between said devices, and means to cause said connection to be maintained until said register actuating device has completed its operative movement.

25. In a mechanism of the character described, a part having a supporting surface provided with a discharge opening, means to guide coins to a predetermined position on said supporting surface adjacent to said discharge opening, means to move the coins separately from said position to said discharge opening, an operable device arranged to be engaged and actuated by each coin as it is moved toward said discharge opening, and means to prevent the passage of said coins through said discharge opening until said operable part has been actuated.

26. In a mechanism of the character described, a part having a supporting surface provided with a discharge opening, means to guide coins to a predetermined position on said surface adjacent to said discharge opening, means to move the coins separately from said position to said discharge opening, an operable device arranged to be engaged and actuated by each coin as it is moved toward said discharge opening, a closure for said discharge opening, and means to automatically move said closure into a position to close said opening to prevent the passage of coins through the same until said operable part has been actuated, and to then move said closure into an inoperative position to permit the coin to be discharged through the opening.

27. In a mechanism of the character described, a part having a supporting surface and provided with a discharge opening, means for positioning coins on said surface adjacent to said discharge opening, a device to separately move said coins from said position toward said discharge opening, an operable device arranged to be engaged and actuated by said coins as they are moved toward said discharge opening, and means to close said discharge opening to prevent the passage of the coin until said operable device has been actuated and to then open said discharge opening to permit the passage of the coin therethrough.

28. In a mechanism of the character described, a part having a supporting surface and provided with a discharge opening, means for positioning coins on said surface adjacent to said discharge opening, a device to separately move said coins from said position toward said discharge opening, an operable device arranged to be engaged and actuated by said coins as they are moved toward said discharge opening, an arm pivotally supported beneath said part and movable toward and from said discharge opening, a closure for said opening carried by said part, and means for actuating said arm in timed relation with the movement of the means for moving said coins toward said discharge opening.

29. In a mechanism of the character described, a part having a supporting surface, and provided with a discharge opening, means for positioning coins of different denominations on said supporting surface and on opposite sides of said discharge opening, means for moving said coins separately from said positions through said discharge openings, and an operable part arranged to be engaged by a coin moved toward said discharge opening from either side thereof.

30. In a mechanism of the character described, a part having a supporting surface and provided with a discharge opening, means for positioning coins of different denominations on said supporting surface on opposite sides of said discharge opening, means for moving said coins separately from said positions through said discharge opening, a register, and a register actuating device arranged to be engaged by a coin moved toward said discharge opening from either side thereof.

31. In a mechanism of the character described, a part having a supporting surface, a register, a register actuating device arranged adjacent to said surface, means for positioning coins of different denominations on said supporting surface on opposite sides of said register actuating device, and means for moving said coins separately from said positions into engagement with said register actuating device.

32. In a mechanism of the character described, a coin separating device comprising a plurality of supporting plates inclined toward one side of said device, said device having discharge openings extending for substantially the full width of each of said plates, a structure having a plurality of tubes and provided with receiving openings adjacent to the respective discharge openings in said separating device and extending for substantially the full width of said structure, each of said receiving openings communicating with one of said tubes, a part arranged to support the coins received by said device, and means to discharge the coins from said tubes.

33. In a mechanism of the character described, a structure comprising two substantially parallel tubes arranged side by side, each of said tubes having a receiving opening extending for substantially the full width of said structure, said receiving openings being arranged one above the other in the same side of said structure.

34. In a machine of the character described, a plurality of devices to position coins of different values for registration, a single means to remove the coins from said plurality of devices, registering mechanism, and a register controlling device controlled by the coins as they are removed from any one of said positioning devices to cause the registration of the value thereof when said parts are operated.

35. In a machine of the character described, a plurality of devices in which coins of different values are positioned for registration, means to remove the coins therefrom, registering mechanism, and a controlling device therefor controlled by the coins as they are removed from any one of said devices to cause registration of the value thereof when said mechanisms are operated.

36. In a machine of the character described, a plurality of devices in which coins of different values are positioned for registration, single means to remove the coins from said plurality of devices, registering mechanism, and a controlling device therefor controlled by the coins as they are removed from any one of said devices to cause registration of the value thereof when said mechanism is operated.

37. In a machine of the character described; a plurality of devices from which coins of different values may be registered, means to remove the coins therefrom, a counter and a counter controlling device controlled by the coins as they are removed from said devices to cause the counter to be variably actuated, when said parts are operated, according to the positions of the respective devices from which the coins are registered.

38. In a machine of the character described; a plurality of devices from which coins of different values may be registered, single means to alternately remove the coins therefrom, registering mechanism and an actuator therefor controlled by the coins as they are removed from said devices to cause registration of the value thereof when said mechanisms are operated.

39. In a machine of the character described; a plurality of devices from which coins of different values may be registered, means to remove the coins therefrom, a normally disengaged counter and a counter controlling device controlled by the coins as they are removed from said devices to cause the counter to be actuated to effect registration thereon of the value of said coins when said parts are operated.

40. In a machine of the character described; registering mechanism for coins, and a plurality of devices in which the coins are received, means to remove the coins therefrom, an aperture common to said devices through which coins so removed are discharged, a plate to receive the coins from said devices and operable to alternately open and close said aperture respectively to position the coins for registration and to cause same to be discharged through the aperture, and means to operate said machine.

41. In a machine of the character described; a plurality of devices from which coins may be registered, means to remove the coins therefrom, an aperture common to said devices through which coins so removed are discharged, a plate alternately operable to close the aperture to receive the coins from said devices and to open the aperture to cause the coins to be discharged therethrough, and means to operate said machine.

42. In a machine of the character described; a plurality of devices from which coins may be registered, means to remove the coins therefrom, a normally closed opening common to said devices through which coins so removed are discharged when said parts are operated.

43. In a machine of the character described, separating mechanism to separate the coins according to their diameters, a tubular structure having a plurality of tubes to receive the coins and position them for registration, discharge openings at the bottom of said tubes to permit of the lateral discharge of said coins, and means for discharging the coins from said tubes, said separating device having means to prevent the discharge therefrom of any coin of a thickness too great to permit it to be discharged through the opening for its tube.

44. In a registering fare box, a passenger register, an operating device connected with said register to cause a fare to be registered upon each operation of said device, a coin controlled money register to register the value of coins, actuating mechanism for said coin controlled register, a connection between said actuating mechanism and said operating device to cause said actuating mechanism to be operated upon each registration of a fare upon said passenger register, and means to disconnect said operating device from said passenger register to permit the actuating mechanism for said coin controlled register to be operated by said operating device independently of said passenger register.

45. In a registering fare box for coins and paper tickets, a passenger register, an operating device connected with said register to cause a fare to be registered thereon on each operation of said device, a device to separate coins from paper tickets, a coin controlled register to register the value of coins, actuating mechanism for said coin controlled register, connections between said operating device, said separating device and said actuating mechanism to cause said separating device and said actuating mechanism to be operated upon each registration of a fare on said passenger register, and means to disconnect said passenger register from said operating device to enable said separating device and said actuating mechanism for said coin controlled register to be operated by said operating device independently of said passenger register.

DAVID B. WHISTLER.

Copies of this patent may be obtained for five cents each, by addressing the "Commissioner of Patents, Washington, D. C."